(12) United States Patent
Hagmann et al.

(10) Patent No.: US 8,398,903 B2
(45) Date of Patent: *Mar. 19, 2013

(54) PROCESS FOR THE PRODUCTION OF CONTACT LENSES USING PLASTIC CASTINGS MOLDS

(75) Inventors: Peter Hagmann, Erlenbach am Main (DE); Axel Heinrich, Schwanewede (DE); Willi Hoerner, Sulzbach (DE); Robert Allen Janssen, Alpharetta, GA (US); John Martin Lally, Lilburn, GA (US); Robert Earl Szokolay, Norcross, GA (US); Bernhard Seiferling, Goldbach (DE)

(73) Assignee: Novartis AG, Basel (CH)

( * ) Notice: Subject to any disclaimer, the term of this patent is extended or adjusted under 35 U.S.C. 154(b) by 290 days.

This patent is subject to a terminal disclaimer.

(21) Appl. No.: 12/905,116

(22) Filed: Oct. 15, 2010

(65) Prior Publication Data

US 2011/0057337 A1 Mar. 10, 2011

Related U.S. Application Data

(60) Division of application No. 10/940,343, filed on Sep. 14, 2004, now Pat. No. 7,845,615, which is a continuation of application No. 10/397,152, filed on Mar. 26, 2003, now Pat. No. 6,821,108, which is a division of application No. 09/645,900, filed on Aug. 25, 2000, now Pat. No. 6,638,451.

(60) Provisional application No. 60/151,669, filed on Aug. 31, 1999.

(51) Int. Cl.
*B29D 11/00* (2006.01)

(52) U.S. Cl. ......................................... 264/1.38; 264/2.5

(58) Field of Classification Search .................... 264/1.1, 264/1.36, 1.38, 2.5; 425/808; 249/134
See application file for complete search history.

(56) References Cited

U.S. PATENT DOCUMENTS

| | | |
|---|---|---|
| 2,936,222 A | 5/1960 | Stevens |
| 3,008,920 A | 11/1961 | Urchick |
| 3,070,573 A | 12/1962 | Beck |
| 3,854,982 A | 12/1974 | Aelion et al. |
| 4,032,440 A | 6/1977 | Yasuda |
| 4,137,550 A | 1/1979 | Kaganowicz et al. |
| 4,311,573 A | 1/1982 | Mayhan et al. |
| 4,312,575 A | 1/1982 | Peyman et al. |
| 4,468,229 A | 8/1984 | Su |
| 4,501,805 A | 2/1985 | Yasuda et al. |
| 4,503,133 A | 3/1985 | van Lier et al. |
| 4,553,975 A | 11/1985 | Su |

(Continued)

FOREIGN PATENT DOCUMENTS

| | | |
|---|---|---|
| EP | 0686486 A2 | 12/1995 |
| EP | 0687551 A2 | 12/1995 |

(Continued)

OTHER PUBLICATIONS

Brennan et al.; Amorphous Phenoxy Thermoplastics With an Extraordinary Barrier to Oxygen; Macromolecules, 1995, pp. 6694-6696, vol. 28, No. 19; Midland, Michigan.

(Continued)

*Primary Examiner* — Mathieu D. Vargot
(74) *Attorney, Agent, or Firm* — Gardner Groff Greenwald & Villanueva, PC

(57) ABSTRACT

The invention is concerned with the problem that with known plastic casting molds, especially those of polypropylene, the lenses produced with these molds have a slippery surface. The invention solves this problem through the use of polymers which are notable for their very low oxygen permeability.

19 Claims, 2 Drawing Sheets

U.S. PATENT DOCUMENTS

| | | |
|---|---|---|
| 4,559,059 A | 12/1985 | Su |
| 4,589,964 A | 5/1986 | Mayhan et al. |
| 4,632,844 A | 12/1986 | Yanagihara et al. |
| 4,640,489 A | 2/1987 | Larsen |
| 4,664,936 A | 5/1987 | Ueno et al. |
| 4,692,347 A | 9/1987 | Yasuda |
| 4,749,457 A | 6/1988 | Yasuda et al. |
| 4,752,426 A | 6/1988 | Cho |
| 4,761,436 A | 8/1988 | Kohno et al. |
| 4,948,485 A | 8/1990 | Wallsten et al. |
| 4,968,532 A | 11/1990 | Janssen et al. |
| 4,980,196 A | 12/1990 | Yasuda et al. |
| 4,981,713 A | 1/1991 | Yasuda et al. |
| 4,994,298 A | 2/1991 | Yasuda |
| 5,028,332 A | 7/1991 | Ohnishi |
| 5,114,629 A | 5/1992 | Morland et al. |
| 5,158,717 A | 10/1992 | Lai |
| 5,166,298 A | 11/1992 | Friedmann et al. |
| 5,176,938 A | 1/1993 | Wallsten et al. |
| 5,182,000 A | 1/1993 | Antonelli et al. |
| 5,252,056 A | 10/1993 | Horner et al. |
| 5,267,390 A | 12/1993 | Yang et al. |
| 5,270,082 A | 12/1993 | Lin et al. |
| 5,274,008 A | 12/1993 | Lai |
| 5,278,384 A | 1/1994 | Matsuzawa et al. |
| 5,300,558 A | 4/1994 | Kurisu et al. |
| 5,312,529 A | 5/1994 | Antonelli et al. |
| 5,508,317 A | 4/1996 | Muller |
| 5,578,332 A | 11/1996 | Hamilton et al. |
| 5,702,735 A | 12/1997 | Martin et al. |
| 5,776,999 A | 7/1998 | Nicolson et al. |
| 5,782,460 A | 7/1998 | Kretzschmar et al. |
| 5,805,264 A | 9/1998 | Janssen et al. |
| 5,815,238 A | 9/1998 | Beaton et al. |
| 5,849,811 A | 12/1998 | Nicolson et al. |
| 5,850,107 A | 12/1998 | Kindt-Larsen et al. |
| 5,861,114 A | 1/1999 | Roffman et al. |
| 5,874,127 A | 2/1999 | Winterton et al. |
| 5,922,249 A | 7/1999 | Ajello et al. |
| 5,935,492 A | 8/1999 | Martin et al. |
| 5,965,630 A | 10/1999 | Imafuku et al. |
| 6,551,531 B1 | 4/2003 | Ford et al. |
| 6,638,451 B1 | 10/2003 | Hagmann et al. |
| 6,719,929 B2 | 4/2004 | Winterton et al. |
| 6,749,779 B2 | 6/2004 | Soane et al. |
| 6,821,108 B2 | 11/2004 | Hagmann et al. |
| 6,874,885 B2 | 4/2005 | Soane et al. |
| 7,387,759 B2 | 6/2008 | Kelly et al. |
| 2004/0075039 A1 | 4/2004 | Dubey et al. |

FOREIGN PATENT DOCUMENTS

| | | |
|---|---|---|
| EP | 0691195 A2 | 1/1996 |
| EP | 0765734 A2 | 4/1997 |
| EP | 0823643 A1 | 2/1998 |
| JP | 7150088 A | 11/1993 |
| WO | 9611782 A1 | 4/1996 |
| WO | 0008413 A1 | 2/2000 |

OTHER PUBLICATIONS

Lai, Yu-Chin; Surface Wettability Enhancement of Silicone Hydrogel Lenses by Processing With Polar Plastic Molds; J Biomed Mater Res.; 1997; Rochester, New York.

PROCESS FOR THE PRODUCTION OF CONTACT LENSES USING PLASTIC CASTINGS MOLDS

CROSS-REFERENCE TO RELATED APPLICATIONS

This application is a Divisional of U.S. non-provisional application Ser. No. 10/940,343, filed Sep. 14, 2004, now U.S. Pat. No. 7,845,615 which is a Continuation of U.S. non-provisional application Ser. No. 10/397,152, filed Mar. 26, 2003, now U.S. Pat. No. 6,821,108, which is a Divisional of U.S. non-provisional application Ser. No. 09/645,900, filed Aug. 25, 2000, now U.S. Pat. No. 6,638,451, which claims under 35 U.S.C. §119(e) the benefit of the filing date of U.S. provisional application No. 60/151,669, filed Aug. 31, 1999, the entirety of which are incorporated herein by reference for all purposes.

TECHNICAL FIELD

The invention relates to a process for the preparation of mouldings, especially optical lenses and in particular contact lenses, to a corresponding device for the preparation of mouldings, and to the mouldings that have been prepared or are obtainable by the process or using the device, especially optical lenses and in particular contact lenses, in accordance with the preamble of each independent patent claim.

BACKGROUND

Contact lenses, which are to be manufactured economically in large unit numbers, are preferably manufactured by the so-called mould or full-mould process. In these processes, the lenses are manufactured into their final shape between two moulds, so that there is no need to subsequently finish the surfaces of the lenses, nor to finish the edges. Such moulds consist of a female mould half and a male mould half, the cavity being formed between the two mould halves defining the shape of the moulding. Mould processes are described for example in PCT application no. WO/87/04390 or in European patent application EP-A-0 367 513.

In these known mould processes, the geometry of the contact lenses to be manufactured is defined by the mould cavity. The edge of the contact lens is likewise formed by the mould which normally consists of two mould halves. The geometry of the edge is defined by the contour of the two mould halves in the area in which they touch one another.

It is to the provision of a meeting these and other needs that the present invention is primarily directed.

SUMMARY

To prepare a contact lens, first of all a certain amount of a flowable starting material is placed in the female mould half. Afterwards, the mould is closed by placing the male mould half thereon. Normally, a surplus of starting material is used, so that, when the mould is closed, the excess amount is expelled into an overflow area outwardly adjacent to the mould cavity. The subsequent polymerisation or crosslinking of the starting material takes place by radiation with UV light, or by heat action, or by another non-thermal method. Both the starting material in the mould cavity and the excess material in the overflow area are thereby hardened. In order to obtain error-free separation of the contact lens from the excess material, a good seal or expulsion of the excess material must be achieved in the contact zone of the two mould halves. Only in this way can error-free contact lens edges be obtained.

The contact lenses produced in this manner are moulded parts having little mechanical stability and a water content of more than 60% by weight. After manufacture, the lens is inspected, then packed and subjected to heat sterilisation at 121° C. in an autoclave.

The materials used for these moulds are preferably plastics, e.g. polypropylene. The moulds are produced by injection moulding and are only used once. This is because, among other things, the moulds are partially contaminated by the surplus material, are damaged when the contact lens is separated or are irreversibly deformed in partial areas when the mould is closed. In particular, because of the quality requirements of the contact lenses edges, the moulds are only used once, since a certain amount of deformation of the moulds at the area of their edge cannot be excluded with certainty.

In U.S. Pat. No. 5,508,317, a new contact lens material is described, which represents an important improvement in the chemistry of polymerisable starting materials for the manufacture of contact lenses. The patent discloses a water-soluble composition of a prepolymer, which is filled into the mould cavity and then crosslinked photochemically. Since the prepolymer has several crosslinkable groups, the crosslinking is characterised by its high quality, so that a finished lens of optical quality can be produced within a few seconds, without the necessity for subsequent extraction or reworking steps. Owing to the improved chemistry of the starting material as illustrated in the patent, contact lenses can be produced at considerably lower cost, so that in this way it is possible to produce disposable lenses that are used only once.

EP-A-0 637 490 describes a process by means of which a further improvement may be obtained in the preparation process of contact lenses with the prepolymer described in U.S. Pat. No. 5,508,317. Here, the material is filled into a mould comprising two halves, whereby the two mould halves do not touch, but a thin circular gap is located between them. The gap is linked to the mould cavity, so that surplus lens material can flow away into the gap. Crosslinking of the prepolymer takes place by radiation especially with UV light, whereby radiation is restricted to the mould cavity by a chromium mask. In this way, only the material in the mould cavity is crosslinked, so that there is high reproducibility of the edges of the lens without closing the two mould halves.

In this process, instead of the polypropylene moulds that may be used only once, reusable quartz/glass moulds are used. Because of the water-soluble basic chemistry, after a lens has been produced, the uncrosslinked prepolymer and other residues can be removed from the moulds rapidly and effectively and dried in the air. In addition, quartz is notable for its good UV permeability and is very hard and refractory.

When using a prefunctionalised PVA (polyvinyl alcohol) polymer as lens material, moreover, important material properties of quartz casting moulds are the excellent replication of the surface geometry, as well as the transparency of the material, so that it is possible to provide visual control of the lens in the mould.

However, moulds made from quartz or glass are very expensive to produce, so that owing to the high costs, the moulds ought to have quite long service life in order to ensure that the process is economical. Therefore, for economic reasons, only a limited number of variants can be realised, for example in respect of the dioptre number.

In order to solve this problem, the intended objective is to replace at least one of the two mould halves, especially the female mould half, with a mould half consisting of plastic, and thus to employ one mould half made of plastic in combination with one mould half made of quartz or glass.

In the plastic moulds, especially polypropylene moulds, which were previously known in the prior art, there was however the problem that the lenses produced with these moulds had a slippery surface. This is because the slipperiness is caused by oxygen, which leads to an inhibition of the crosslinking reaction at the surface of the lens, this becoming apparent macroscopically in a "slipperiness" of the lens. It is assumed that oxygen, which is already present at the surface of the casting mould or migrates to the surface of the mould during the polymerisation process, inhibits polymerisation of the lens material at the lens surface. Thus, the interface between the mould and the lens material appears to be crucial.

In order to avoid this problem, it is known from EP-A-0 687 550 that the plastic mould halves can be degassed and then transported and filled in a nitrogen atmosphere. This however requires a technical process that is very complex and in addition is very cost-intensive.

WO-A-96/11782 describes a process operating under an inert gas atmosphere and/or one using moulds in which the oxygen contained therein has been drawn off completely by means of treatment with a vacuum or with an inert gas, thus producing "non-slippery" lenses. It also describes that the oxygen in the material from which the lenses are produced is completely drawn off prior to lens manufacture. However, the cost of these additional process steps is very high and the process steps are very time-consuming.

It is the aim of the present invention to further develop a process and a device of the generic kind and to improve them in such a way that it is possible to use mould halves of plastic in conjunction with mould halves of quartz or glass, without the above-mentioned difficulties and problems arising. In particular, the plastic mould halves should be reusable, and any burr or web formation on the finished contact lenses should be avoided, so that the rejection rate of the contact lenses is very low. In addition, optical monitoring of the lens through the casting mould should be possible.

The invention solves the problem by means of the features indicated in claim 1 and claim 11. As far as further essential developments of the process according to the invention and of the device according to the invention are concerned, reference is made to the dependent claims.

Through the choice of polymers for the production of plastic mould halves, which have very low oxygen permeability, the oxygen is prevented to a great extent from reaching the cavity during polymerisation, and thus prevented from making contact with the starting material for the lenses. The idea behind this is that the oxygen which impairs polymerisation or crosslinking of the lens surface originates from the casting mould with which the lens material comes into contact. It could be shown that when using polymers for the mould, which have only slight oxygen permeability, lenses having no surface slipperiness can be produced. It is thus possible to manufacture lenses in an atmospheric environment whilst simultaneously using plastic mould halves. Since it is not necessary to produce the lenses in a nitrogen atmosphere, production costs may be substantially reduced.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

Further aspects and advantages of the process according to the invention and of the device according to the invention will be seen from the description that follows, in conjunction with the drawings.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
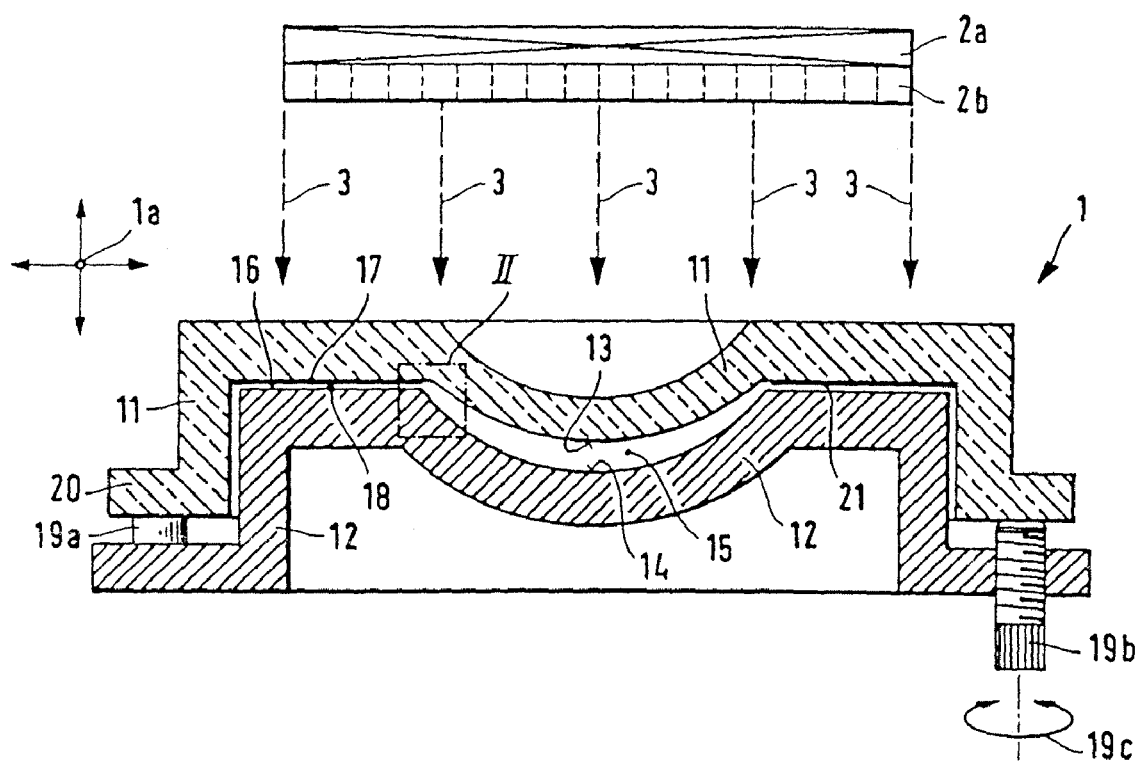
FIG. 1 shows a section through an embodiment of a casting mould according to the invention in closed state.

The device shown in FIG. 1 is designed for the manufacture of contact lenses from a liquid starting material which may be polymerised or crosslinked by UV radiation. It comprises a mould 1 and an energy source 2a, here a UV light source, as well as means 2b for directing the energy provided by the energy source 2a to the mould in the form of an essentially parallel beam. Of course, the energy source 2a and means 2b can also be combined to form a single unit.

The mould consists of two mould halves 11 and 12, each having a curved mould surface 13 and 14 which together define a mould cavity 15, which in turn determines the shape of the contact lens to be manufactured. The mould surface 13 of the upper mould half 11 in the drawing is convex and determines the rear and basic face of the contact lens with the connected edge area; this mould half is normally called the father mould half. Conversely, the mould surface 14 of the other mould half, which is correspondingly called the mother mould half, is concave and determines the front face of the contact lens to be manufactured, likewise with the connected edge area.

The mould cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mould wall 17 and 18 on each of the father mould half 11 and the mother mould half 12. In order to prevent complete closure of the mould, spacers, for example in the form of several bolts 19a or 19b, are provided on the mother mould 12, and these interact with a collar or flange 20 of the father mould 11 and keep the two mould halves at such a distance apart that the said annular gap 16 results. As is indicated symbolically in FIG. 1 by the right-hand spacer bolt 19b with a thread, the spacers may also be of adjustable or spring-action formation. In this way, the two mould halves 11, 12 can be moved towards one another during the crosslinking process to balance out leakage, by adjusting the spacers (indicated symbolically by the arrow 19c showing the direction of rotation) or against a spring action. Of course, the mould can be opened and closed in the usual manner, for example by means of a closure unit which is indicated here only by the arrow symbol 1a. Adjustment of the gap between the two mould halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mould halves are also conceivable.

On the mould wall 17 in the area of the annular gap 16, there is a mask 21 which is impermeable to the energy form employed, here this is UV light, (or a mask which at least has poor permeability compared with the permeability of the mould), and this mask extends right to the mould cavity 15, and with the exception of the same, screens all the other parts, hollow spaces or areas of the mould 1 that are in contact with or may come into contact with the liquid, uncrosslinked, possibly excess material, from the radiated energy. Partial areas of the lens edge are therefore formed not by a limitation of the material by mould walls, but by a spatial limitation of the radiation or other forms of energy triggering polymerisation or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

Figure 2:
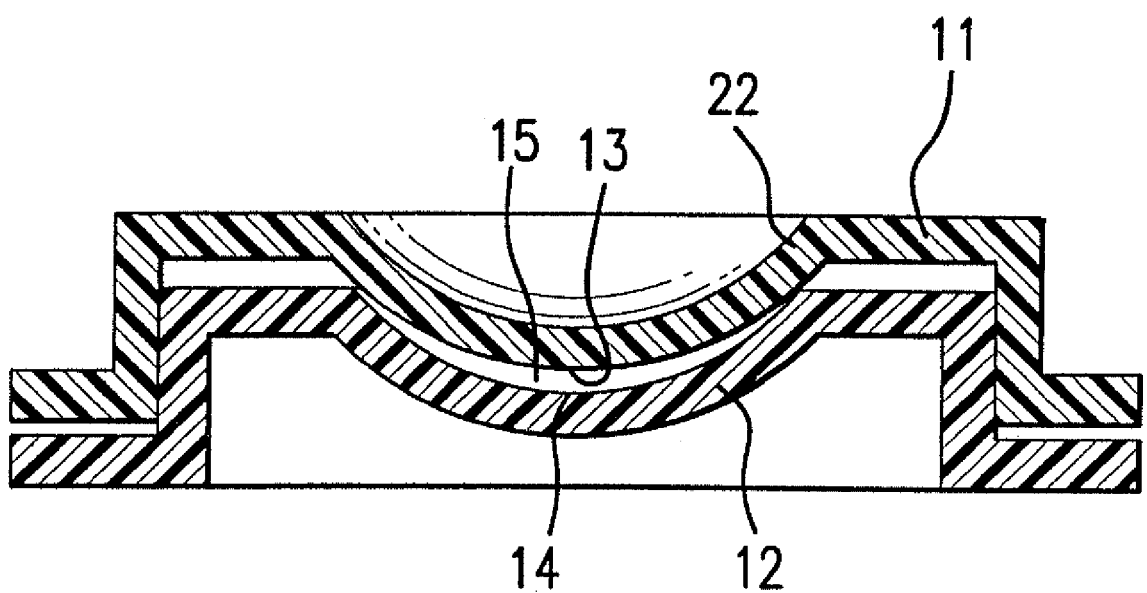
FIG. 2 shows a section through a second embodiment of a casting mould according to the invention in closed state.

As well as this casting mould illustrated in FIG. 1, other configurations are however also possible, for example the embodiment illustrated in FIG. 2. This casting mould similarly consists of two mould halves 11 and 12, each of which has a curved surface 13 and 14, which together define a mould cavity 15. The mould surface 13 of the upper mould half 11 in the drawing is convex and determines the rear and basic face of the contact lens; this mould half is normally called the father mould half. Conversely, the mould surface 14 of the other mould half is concave and is called the mother mould half. It defines the front face of the contact lens to be manufactured. The edge region of the contact lens is defined by the limiting area 22. After filling the lens material into the mother mould half 12, the mould is closed by placing the male mould half 11 thereon. Normally, a surplus of starting material is used, so that, when the mould is closed, the excess amount is expelled into an overflow area outwardly adjacent to the mould cavity 15. The subsequent polymerisation or crosslinking of the starting material takes place by radiation with UV light, or by heat action, or by another non-thermal method. Both the starting material in the mould cavity 15 and the excess material in the overflow area are thereby hardened. The geometry of the edge of the contact lens is defined by the contour of the two mould halves 11, 12 in the area in which they touch one another. In order to obtain error-free separation of the contact lens from the excess material, a good seal or expulsion of the excess material must be achieved in the contact zone 22 of the two mould halves 11, 12. Only in this way can error-free contact lens edges be obtained.

In general, the oxygen permeability coefficient P of a polymer may be described by the following formula:

$$P = D \times S,$$

with
P: oxygen permeability of the polymer
D: oxygen diffusion constant of the polymer
S: oxygen solubility in the polymer The permeability coefficient P is a measure of the degree of oxygen which acts on the lens material during the hardening process and thus effects an inhibition of the polymerisation reaction. The lower the oxygen permeability coefficient, the less oxygen that reaches the surface of the mould cavity 15 and the lower the inhibition of polymerisation at the surface of the lens.

Since, in the embodiments shown here, the UV radiation only comes from one side, from the top, in fact only the father mould half 11 needs to be permeable to UV light. If radiation comes from below through the mother mould half 12, of course the same applies in reverse. According to an especially suitable and advantageous arrangement of the invention, the mould half which is exposed to UV light is made of quartz, while the other mould half is made of a polymer. However, within the scope of the invention, both mould halves 11, 12 may also be made of a polymer, and it is also conceivable that the impacting of the crosslinkable material located in the mould cavity 15 with energy that effects crosslinking, may also be effected not only from one side, but also from two sides. In this case, it must be ensured that both mould halves are permeable to UV light.

According to the invention, the materials that may be considered for the casting moulds are a number of polymers, which however in respect of their oxygen permeability must be below the value $$5 \times 10^{-11} \frac{(\text{ml O}_2 \text{ at } STP)(\text{mm})}{(\text{cm}^2)(s)(torr)}$$

Table 1 lists the oxygen permeability P of various polymers, whereby the relative values are taken from the book: "Polymer Handbook", and have been recalculated into absolute values corresponding to the value given for polypropylene in Table 1 on page 61 of the book "Polymer permeability, 1. Polymers and polymerization", from Elsevier Applied Science Publishers LTD 1985, Reprinted 1986. The unit of oxygen permeability is:

$$\frac{(\text{ml O}_2 \text{ at } STP)(\text{mm})}{(\text{cm}^2)(s)(torr)}$$

According to the invention, at least one of the two mould halves 11 and 12 consists of a polymer that has an oxygen permeability lower than $$5 \times 10^{-11} \frac{(\text{ml O}_2 \text{ at } STP)(\text{mm})}{(\text{cm}^2)(s)(torr)}$$

TABLE 1

Oxygen permeability of various polymers

| polymer | oxygen permeability |
|---|---|
| polyacrylonitrile (PA) | 0.0025 |
| methacrylate/acrylonitrile copolymer (MAN) | 0.051 |
| CR-39 (polymer consisting of allyl diglycol carbonate monomer) | 0.15 |
| polymethylmethacrylate (PMMA) | 1.4 |
| polypropylene (PP) | 21 |
| polystyrene (PS) | 32 |

The table shows that the permeability coefficient for polyacrylonitrile (PA) and polymethylmethacrylate (PMMA) is 10 to 1000 times lower than the values for polypropylene (PP) and polystyrene (PS). It has been shown that the lenses that were produced with plastic moulds made of PP and PS in a normal ambient atmosphere had a considerably higher degree of slipperiness than lenses produced with moulds made of PA or PMMA.

According to a further concept of the invention, it is advantageous to select a material that has a high absorption coefficient for UV light, or to provide materials with UV absorbers, in order to attain the desired UV absorption. The UV stability of the casting moulds and thus their service life may thereby be decisively improved.

Further studies were carried out with CP-75 UVA and CP-71 UVA (both PMMA with a UV absorber), PMMA GS-222 from the company Röhm, Goldflex (GF), Delrin (DR), Luran 368R (styrene/acrylonitrile copolymer, SAN), Terlux KR-2812 (methylmethacrylate/acrylonitrile/butadiene/styrene polymer, MABS), Barex 210 (methacrylate/acrylonitrile polymer, MAN), Topas from the company Ticono, as well as CR-39 (chemically crosslinked polymer consisting of allyl diglycol carbonate monomer), which were similarly notable for their low oxygen permeability coefficient. It is demonstrated that very good results are obtained as regards shape and UV stability of the moulds, as well as good lens quality, especially using materials CP-75, CP-71, CR-39, PMMA GS-22 and Barex.

To crosslink the starting material, UV light with a wavelength of λ>280 nm is preferably used. By using longer wavelength UV light, the demands placed on the UV stability of the polymers are substantially lowered.

It has been shown that when choosing a polymer for the mother mould half 12, which has high UV absorption, the quality of the edge of a lens produced in a device according to FIG. 1 can be improved, compared with a device in which both mould halves consist of quartz/glass.

In the embodiment illustrated in FIG. 1, radiation with UV light to crosslink the polymer takes place through the male casting mould 11. If the female mould half 12 consists of a material that does not absorb UV light, reflections of the UV light can occur. The reflected UV light now crosslinks the lens material below the mask 21 of the male casting mould 11, whereupon a non-sharp contact lens edge is produced, since the material around the actual edge is crosslinked by reflected UV light. If, on the other hand, UV-absorbing materials are used for the female mould half 12, these problems do not arise.

The processes which may be considered for the production of plastic moulds may be a number of techniques, for example injection moulding, lathing and polishing. These technologies are established, so that the production process is relatively simply to carry out and they do not require particularly great resources.

In addition, almost all of the above-listed plastics enable optical control of the lenses taking place through the casting mould, since they are transparent and also do not become hazy during long-term exposure to UV light.

While the invention has been described with reference to preferred and example embodiments, it will be understood by those skilled in the art that a variety of modifications, additions and deletions are within the scope of the invention, as defined by the following claims.

What is claimed is:

1. A process for the production of a contact lens, comprising polymerizing and/or crosslinking a starting material in a mold to form the contact lens, wherein the starting material is polymerizable and/or crosslinkable by means of UV radiation, wherein the mold has a first mold half having a first optical surface in contact with the starting material and a second mold half having a second optical surface in contact with starting material, wherein said first mold half and said second mold half are configured to receive each other such that the cavity is formed between said first optical surface and said second optical surface, wherein at least one of the first and second mold halves comprises a polymer having a very low oxygen permeability characterized by being less than $$5 \times 10^{-11} \frac{(\text{ml } O_2 \text{ at } STP)(\text{mm})}{(\text{cm}^2)(s)(torr)}$$

so that oxygen is prevented from reaching the first and/or second optical surfaces during polymerizing and/or crosslinking process and that inhibition of polymerizing and/or crosslinking of the starting material at starting material/optical surface interface is substantially minimized or eliminated, wherein the at least one of the first and second mold halves comprises UV absorbers distributed in the polymer, and wherein the polymer is selected from the group consisting of methamethacrylate/acrylonitrile/butadiene/styrene copolymer, methacrylate/acrylonitrile copolymer, cyclic olefin copolymers, and diallyl diglycol carbonate polymer.

2. A process according to claim 1, wherein the first mold half comprises the polymer having an oxygen permeability of less than $$5 \times 10^{-11} \frac{(\text{ml } O_2 \text{ at } STP)(\text{mm})}{(\text{cm}^2)(s)(torr)}.$$

3. A process according to claim 1, wherein both the first and second mold halves comprise the polymer having an oxygen permeability of less than $$5 \times 10^{-11} \frac{(\text{ml } O_2 \text{ at } STP)(\text{mm})}{(\text{cm}^2)(s)(torr)}.$$

4. A process according to claim 3, wherein both of the first and second mold halves comprise UV absorbers distributed in the polymer.

5. A process according to claim 2, wherein the polymer is cyclic olefin copolymers.

6. A process according to claim 5, wherein the first mold half is a male mold half.

7. A process according to claim 5, wherein the first mold half is a female mold half.

8. A process for producing a contact lens, comprising exposing a starting material for producing the contact lens present in a mold to UV radiation to polymerize and/or crosslink the starting material;
   wherein the mold comprises a first mold half and a second mold half, wherein the first mold half and second mold half are configured to receive each other such that a cavity is formed between the first mold half and second mold half, wherein only the first mold half comprises a polymer having an oxygen permeability less than $$5 \times 10^{-11} \frac{(\text{mL } O_2 \text{ at } STP)(\text{mm})}{(\text{cm}^2)(s)(torr)}$$

wherein the polymer comprises a polymer derived from norbornene, and wherein the polymer of the first mold half comprises UV absorbers.

9. The process of claim 8, wherein the first mold half is a concave female mold and the second mold half is a convex male mold.

10. The process of claim 9, wherein the first mold half is composed of a co-polymer of ethylene and norbornene.

11. The process of claim 8, wherein the first mold half is a concave female mold having a first surface and the second mold half is a convex male mold having a second surface, wherein (1) the first mold half is filled with starting material and (2) the second mold half is placed on the first mold half to close the mold, wherein the starting material is in contact with the first surface of the first mold half and the second surface of the second mold half.

12. The process of claim 8, wherein the energy source comprises light having a wavelength greater than 280 nm.

13. The process of claim 8, wherein the first mold half is concave female mold having a first surface and the second mold half is a convex male mold having a second surface, wherein (1) the first mold half is filled with starting material and (2) the second mold half is placed on the first mold half to close the mold, wherein the starting material is in contact with the first surface of the first mold half and the second surface of the second mold half, wherein only the first mold half comprises a polymer having an oxygen permeability less than $$5 \times 10^{-11} \frac{(\text{mL } O_2 \text{ at } STP)(\text{mm})}{(\text{cm}^2)(s)(torr)}$$

wherein the polymer comprises a polymer derived from norbornene, and wherein the starting material is exposed to light having a wavelength greater than 280 nm.

14. A process for producing a contact lens, comprising exposing a starting material for producing the contact lens present in a mold to UV radiation to polymerize and/or crosslink the starting material; wherein, the mold comprises a first mold half having a first optical surface in contact with the lens material and a second mold half having a second optical surface in contact with lens material, wherein said first mold half and said second mold half are configured to receive each other such that a cavity is formed between said first optical surface and said second optical surface, wherein the cavity defines the shape of a contact lens to be molded, wherein the lens material is polymerizable and/or crosslinkable by UV energy, wherein at least one of the mold halves is made from a mold material comprising a polymer selected from the group consisting of methamethacrylate/acrylonitrile/butadiene/styrene copolymer, methacrylate/acrylonitrile copolymer, cyclic olefin copolymers, chemically crosslinked polymer consisting of allyl diglycol carbonate monomer, wherein the polymer of the at least one mold half comprises UV absorbers, wherein the polymer has a very low oxygen permeability characterized by a value of less than $$5 \times 10^{-11} \frac{(\text{ml } O_2 \text{ at } STP)(\text{mm})}{(\text{cm}^2)(s)(torr)}$$

so as to be capable of substantially minimizing and/or eliminating inhibition of polymerizing and/or crosslinking of the lens material at interface between the lens material and the first or second optical surface by preventing oxygen from reaching the first or second optical surface during polymerizing and/or crosslinking process.

15. The process according to claim 14, wherein the first mold half comprises the polymer having an oxygen permeability of less than $$5 \times 10^{-11} \frac{(\text{ml } O_2 \text{ at } STP)(\text{mm})}{(\text{cm}^2)(s)(torr)}.$$

16. The process according to claim 14, wherein both the first and second mold halves comprise the polymer having an oxygen permeability of less than $$5 \times 10^{-11} \frac{(\text{ml } O_2 \text{ at } STP)(\text{mm})}{(\text{cm}^2)(s)(torr)}.$$

17. The process according to claim 14, wherein the polymer is a cyclic olefin copolymers.

18. The process according to claim 17, wherein the first mold half is a male mold half.

19. The process according to claim 17, wherein the first mold half is a female mold half.

* * * * *